Nov. 11, 1969  C. L. MOORMAN  3,477,681
GRID AND HANDLE WITH INTERCONNECTED PIN AND SLOT ACTUATOR
Filed May 5, 1967

INVENTOR.
Cletus L. Moorman
BY
Carl A. Stickel
ATTORNEY

United States Patent Office 3,477,681
Patented Nov. 11, 1969

3,477,681
GRID AND HANDLE WITH INTERCONNECTED
PIN AND SLOT ACTUATOR
Cletus L. Moorman, Trotwood, Ohio, assignor to General
Motors Corporation, Detroit, Mich., a corporation of
Delaware
Filed May 5, 1967, Ser. No. 636,327
Int. Cl. F25c 1/24
U.S. Cl. 249—72                               5 Claims

ABSTRACT OF THE DISCLOSURE

In the preferred form, a pivoted horizontal handle is formed of a rod having its opposite ends formed into pivot pins extending into pivoting holes in the front projecting ends of the twin upper longitudinal wall. The opposite ends of the rod are also formed with offset portions offset from the pivoting axis which engage vertical slots in the front projecting ends of the twin lower longitudinal walls. The lower longitudinal walls are locked in the tray to provide a connection between the handle and the tray. The movement of the handle from its lower to its upper position moves the upper longitudinal walls and the top portions of the transverse walls toward the handle for ejecting ice cubes from the compartments of the grid and tray.

---

Ice tray and grid combinations have used an offset pin and link arrangement for moving their transverse walls. While such an arrangement has proved to be satisfactory in operation the number of parts and the necessary assembly operations keep the cost relatively high.

It is an object of this invention to reduce the number of parts of a tray and ejecting grid to a minimum and to simplify the assembling operations thereof.

This and other objects are attained in the form shown in the drawings in which a pivot pin and slot arrangement forms a scotch yoke type actuating arrangement between the rod type handle and the movable walls of the grid for the ejecting operation.

Further objects and advantages of the present invention will be apparent from the following description, reference being had to the accompanying drawings, wherein a preferred embodiment of the invention is clearly shown.

Figure 1:
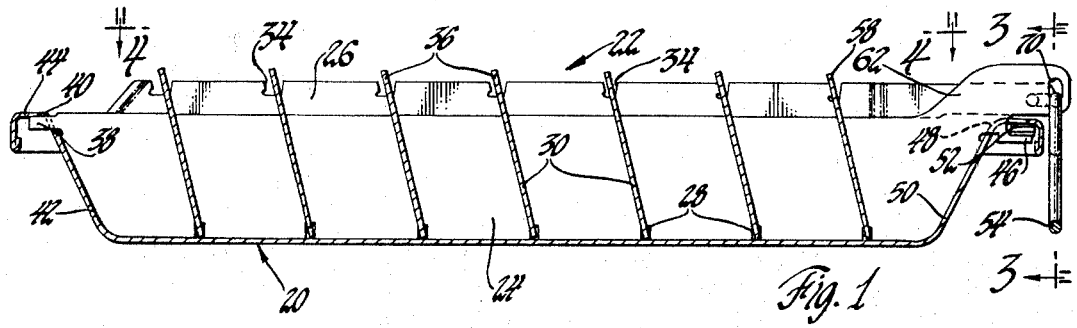
FIGURE 1 is a longitudinal sectional view through a twin bar type freezing tray and grid embodying one form of my invention taken along the lines 1—1 of FIGURE 4 with the grid and handle shown in the freezing position.

Referring now to the drawings, there is shown a freezing tray 20 and a grid 22 of the twin bar type having upright twin lower longitudnal walls 24, tilted outwardly and upon which slide the upright twin upper longitudinal walls 26. The bottoms of the lower longitudinal walls 24 are provided with a series of uniformly spaced notches 28 which receives the webs at the bottoms of the movable transverse walls 30 which are located at the bottom of the upright slots 32 through which project the lower and upper longitudinal walls 24 and 26. The top of the upper longitudinal wall 26 is also provided with a series of uniformly spaced notches 34 which receive the webs 36 at the top of each of the slots 32 in each of the transverse walls 30. The rear ends of the lower transverse walls 24 are provided with upper projections 38 extending through slots 40 in the top of the rear wall 42 of the tray 20 just beneath the rim 44.

The front end of each of the lower longitudinal walls 24 is provided with a forwardly extending projection 46 extending through a pair of slots 48 in the front portion of the rim 44 and the adjacent portion of the front wall 50 of the tray 20. The lower longitudinal walls 24 are locked in place by the loop-shaped transverse spring members 52 extending between the front portion of the rim 44 and the projection 46.

According to my invention, a simple handle 54 formed of a metal rod has a scotch yoke type of actuating arrangement with the upper and lower longitudinal walls 24 and 26. This handle 54 is in the form of a rectangular loop-shaped wire rod having projecting portions 56 extending outwardly from the upper side of the rectangular portion. The upper longitudinal walls 26 in front of the foremost transverse partition wall 58 are provided with first outwardly extending offsets 60 which extend along the outer faces of the twin forwardly and upwardly extending projecting offsets 62 at the front of the lower longitudinal walls 24. The upper longitudinal walls 26 are provided with second outwardly extending offsets 64 above the front of the rim 44 which are provided with pivot holes receiving the outturned projecting pivot ends 66 of the projections 56 of the handle 54. The front portion of each of the offsets 62 is provided with a vertical slot 70.

Figure 2:
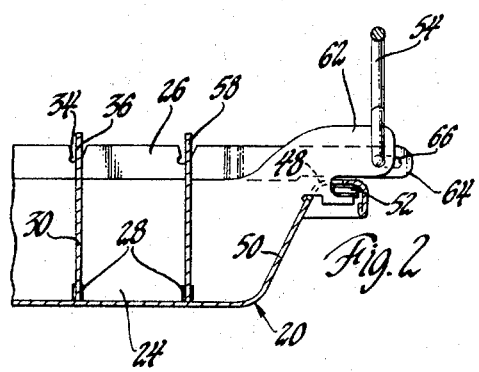
FIGURE 2 is a fragmentary vertical sectional view similar to FIGURE 1 showing the handle and grid in the ejected position.
Figure 3:
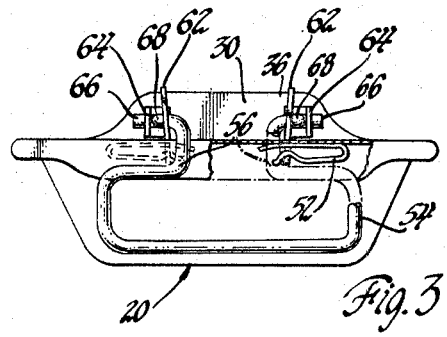
FIGURE 3 is a front end view of the handle and of the tray taken along the lines 3—3 of FIGURE 1.

The projections 56 are provided with offsets 68 between the vertical slots 70 and the holes in the second offsets 64 of the upper longitudinal walls 26. The offsets 68 are substantially perpendicular to the rectangular loop portion of the handle 54 and extend rearwardly from this loop portion when the handle 54 is in the desired initial downward position illustrated in FIGURES 1, 3 and 4 to position the upper longitudinal wall and the webs at the tops of the transverse walls 30 in their rearmost position in which the liquid is frozen in the tray 20. After the liquid is frozen, the handle 54 is lifted in an 180° counterclockwise movement from the position shown in FIGURES 1 and 4 to the position shown in FIGURE 2. The notches 34 in the upper longitudinal wall 26 are of progressively increasing width. The scotch yoke type of actuation provided by the slots 70, the offsets 68 and the pivoting portions 66 provide initially an infinitely great mechanical advantage for first moving the front transverse wall 58. Additional movement of the handle 54 causes the notches 34 to progressively engage the transverse walls 30 between the transverse wall 58 and the rear wall 42 of the tray 20. As the handle 54 is moved upwardly and the mechanical advantage is reduced as the relative movement of the upper longitudinal wall 26 increases. The mechanical advantage therefor is reduced as the amount of frozen liquid remaining to be loosened or freed is reduced. This provides a smoother, easier, very satisfactory form of ejecting operation.

The construction of the grid is simplified since the primary actuation thereof is limited to three simple parts, namely the lower and upper longitudinal walls 24 and 26 and the handle 54 which is formed of a single length of rod. No rivets are required and since the handle 54 by reason of its resilient rectangular loop-shape and the arrangement of the projecting portions 56 on the outer side of the projecting portions 62 can be sprung sufficiently that the ends 66 can easily be passed through the slots 70 into the pivot holes in the offsets 64. This greatly simplifies assembly and makes it possible to lower the cost of the trays.

Figure 4:
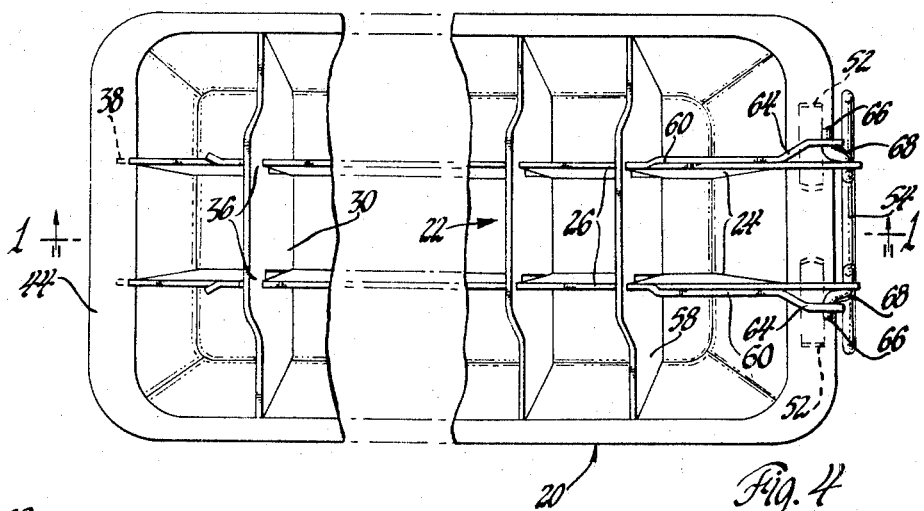
FIGURE 4 is a fragmentary plan view of the tray taken along the lines 4—4 of FIGURE 1.
Figure 5:
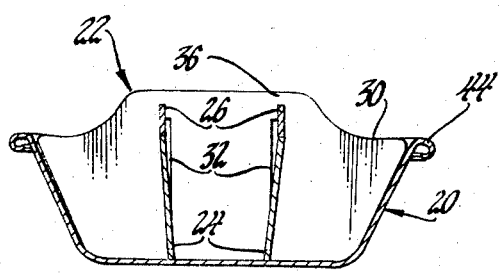
FIGURE 5 is a transverse vertical sectional view taken along the line 5—5 of FIGURE 1.

The parts of the tray and grid may be made of any suitable metal such as aluminum with a patterned or plain surface coated with antiadhesive material or some or all of the parts may be made of some suitable plastic. The lower longitudinal walls 24 are slanted or canted outwardly at a slight angle as illustrated in FIGURES 4 and 5, if desired. Also, if desired, the second set of longitudinal walls may be omitted.

While the embodiment of the invention as herein discloses constitutes a preferred form, it is to be understood that other forms might be adopted.

What is claimed is as follows:

1. A grid for a freezing tray including a lower longitudinal wall and transverse movable walls intersecting said lower longitudinal wall, an upper longitudinal wall, longitudinally movable relative to the lower longitudinal wall, said upper wall having means for engaging upper portions of said transverse walls and said lower wall having means for engaging lower portions of said transverse walls, wherein the improvement comprises one of said longitudinal walls having a hole, a pivoted handle provided with a pivot portion rotatably mounted in said hole and an offset portion as an integral extension of said pivot portion offset from the axis of said pivot portion, said offset portion and the other of said longitudinal walls having an interengaged pin and slot arrangement for moving the upper longitudinal wall and said transverse walls relative to said lower longitudinal wall.

2. A grid as defined in claim 1 in which second lower and upper relatively movable longitudinal walls are located generally parallel to and spaced from the first mentioned longitudinal walls, one of said second walls being provided with a second hole substantially aligned with the first mentioned hole, said handle being provided with an additional pivot portion pivotally engaging said second hole and an additional offset portion, said additional offset portion and the other of said second walls being provided with a second interengaged pin and slot arrangement for relatively moving said second walls.

3. A grid as defined in claim 1 in which second lower and upper relatively movable longitudinal walls are located generally parallel to and spaced from the first mentioned longitudinal walls, one of said second walls being provided with a second hole substantially aligned with the first mentioned hole, said handle being formed of a rod provided with portions forming the pivot portions engaging both holes and offset portions offset from the axis of said pivot portions, both other longitudinal walls being provided with slots receiving said offset portions for relatively moving said upper and lower longitudinal walls.

4. A grid as defined in claim 1 in which second lower and upper relatively movable longitudinal walls are located generally parallel to and spaced from the first mentioned longitudinal walls, one of said second walls being provided with a second hole substantially aligned with the first mentioned hole, said handle being formed of a rod provided with opposite end portions each comprising a pivot portion rotatably mounted in one of said holes and an offset portion engaging said slot for moving said upper walls relative to said lower walls.

5. A freezing tray including a grid, said grid including a set of two lower longitudinal walls, a set of two upper longitudinal walls longitudinally movable relative to the lower longitudinal walls, transverse movable walls intersecting said lower and upper longitudinal walls, said upper walls having means for engaging the upper portions of said transverse walls and said lower walls having means for engaging lower portions of said transverse walls, one of said sets of longitudinal walls being provided with transverse holes, a handle formed of a rod provided with opposite end portions, each end portion comprising a pivot portion rotatably mounted in one of said holes and an integral offset portion adjacent said pivot portion, said offset portions and the other set of longitudinal walls having interengaging pin and slot arrangements for moving the upper longitudinal walls and said transverse walls relative to said lower longitudinal walls, said tray receiving said grid, and means for locking said grid to the tray comprising means for connecting said lower longitudinal walls to the tray for connecting said handle to the tray.

References Cited

UNITED STATES PATENTS

| | | | |
|---|---|---|---|
| 2,201,585 | 5/1940 | Keiper | 249—72 |
| 2,642,726 | 6/1953 | Frei | 249—72 |
| 3,335,577 | 8/1967 | Straham et al. | 249—72 X |
| 3,335,578 | 8/1967 | Straham et al. | |
| 3,355,138 | 11/1967 | Frei et al. | 249—71 |
| 3,380,702 | 4/1968 | Straham | 249—71 |
| 3,386,698 | 6/1968 | Albright | 249—72 X |
| 2,226,184 | 12/1940 | Storer | 249—72 |

FOREIGN PATENTS 1,016,280   9/1957   Germany.

J. HOWARD FLINT, JR., Primary Examiner